US011791092B2

(12) United States Patent
Deville et al.

(10) Patent No.: US 11,791,092 B2
(45) Date of Patent: *Oct. 17, 2023

(54) SLIDE-ON INDUCTIVE COUPLER SYSTEM

(71) Applicant: Schlumberger Technology Corporation, Sugar Land, TX (US)

(72) Inventors: Benoit Deville, Houston, TX (US); Yann Dufour, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,780

(22) Filed: Jul. 15, 2022

(65) Prior Publication Data
US 2022/0351899 A1    Nov. 3, 2022

Related U.S. Application Data

(63) Continuation of application No. 15/034,911, filed as application No. PCT/US2014/064522 on Nov. 7, 2014, now Pat. No. 11,417,460.
(Continued)

(51) Int. Cl.
*H01F 38/14* (2006.01)
*E21B 47/01* (2012.01)
(Continued)

(52) U.S. Cl.
CPC ......... *H01F 38/14* (2013.01); *E21B 17/0283* (2020.05); *E21B 47/01* (2013.01);
(Continued)

(58) Field of Classification Search
CPC .... H01F 38/14; H01F 2038/143; H02J 50/10; E21B 17/0283; E21B 17/028; E21B 47/01; E21B 41/01; H04B 5/0037
See application file for complete search history.

(56) References Cited

U.S. PATENT DOCUMENTS 5,174,340 A * 12/1992 Peterson ............... F16L 9/02
138/119
6,311,774 B1 * 11/2001 Brockman ............ E21B 33/146
166/74

(Continued)

FOREIGN PATENT DOCUMENTS

WO    2011141173 A2    11/2011
WO    2012091575 A1    7/2012

OTHER PUBLICATIONS

International Search Report and Written Opinion issued in International Application PCT/US2014/064522, dated Feb. 23, 2015 (8 pages).

*Primary Examiner* — Robert E Fuller
*Assistant Examiner* — Neel Girish Patel
(74) *Attorney, Agent, or Firm* — Michael Wills, III

(57) ABSTRACT

A technique facilitates use of an inductive coupler assembly with casing, e.g. well casing. An inductive coupler is formed as a female inductive coupler with an inductive coil. The inductive coupler is constructed for sliding movement along an exterior of the casing so that it may ultimately be positioned and secured at a suitable location along the casing. The inductive coupler is designed for connection with an electrical device, e.g. a sensor. The inductive coupler facilitates the transfer of sensor data and/or power signals across the casing. Signal transfer across the casing is further enabled by a male inductive coupler positioned within the casing at a location which allows it to cooperate with the exterior, female inductive coupler.

17 Claims, 6 Drawing Sheets

Related U.S. Application Data

(60) Provisional application No. 61/902,069, filed on Nov. 8, 2013.

(51) Int. Cl.
    *E21B 17/02*     (2006.01)
    *H02J 50/10*     (2016.01)
    *H04B 5/00*     (2006.01)

(52) U.S. Cl.
    CPC ............ *H02J 50/10* (2016.02); *H04B 5/0037* (2013.01); *H01F 2038/143* (2013.01)

(56) References Cited

U.S. PATENT DOCUMENTS

| | | | |
|---|---|---|---|
| 6,325,150 B1* | 12/2001 | Rayssiguier | E21B 34/06 166/334.4 |
| 7,168,487 B2 | 1/2007 | Salamitou et al. | |
| 7,212,173 B2* | 5/2007 | Chen | G01V 3/28 343/895 |
| 7,219,729 B2* | 5/2007 | Bostick, III | E21B 47/10 166/250.01 |
| 7,795,872 B2* | 9/2010 | Clark | G01V 3/28 324/338 |
| 8,334,786 B2 | 12/2012 | Bowles et al. | |
| 8,683,859 B2 | 4/2014 | Godager | |
| 8,689,621 B2 | 4/2014 | Godager | |
| 9,000,873 B2 | 4/2015 | Deville et al. | |
| 2002/0066561 A1* | 6/2002 | Brockman | E21B 43/08 166/250.15 |
| 2002/0114216 A1* | 8/2002 | Veneruso | E21B 17/0283 367/83 |
| 2004/0026086 A1* | 2/2004 | Patel | E21B 23/04 166/381 |
| 2004/0182582 A1* | 9/2004 | Bosma | E21B 33/128 166/387 |
| 2004/0263414 A1 | 12/2004 | Chen et al. | |
| 2006/0048941 A1* | 3/2006 | Borst | E21B 37/00 166/66.5 |
| 2007/0068673 A1* | 3/2007 | Daily | E21B 47/01 166/254.2 |
| 2009/0008078 A1* | 1/2009 | Patel | E21B 43/14 166/313 |
| 2009/0045974 A1* | 2/2009 | Patel | G01V 11/002 340/854.6 |
| 2009/0066535 A1* | 3/2009 | Patel | E21B 41/0035 340/853.2 |
| 2009/0085701 A1* | 4/2009 | Veneruso | H01F 27/266 336/212 |
| 2009/0151950 A1* | 6/2009 | Patel | E21B 47/12 166/244.1 |
| 2010/0018305 A1* | 1/2010 | Maute | E21B 47/113 73/152.29 |
| 2011/0192593 A1* | 8/2011 | Roddy | E21B 47/005 166/250.01 |
| 2011/0284216 A1* | 11/2011 | Addis | E21B 47/01 166/250.01 |
| 2013/0048269 A1* | 2/2013 | Tarayre | H01Q 7/00 340/855.1 |
| 2013/0120093 A1* | 5/2013 | Deville | H01F 38/14 336/115 |
| 2013/0264063 A1* | 10/2013 | Hallundbæk | E21B 34/14 166/332.1 |
| 2013/0334894 A1* | 12/2013 | Borgen | H04B 5/0031 307/104 |
| 2014/0266210 A1 | 9/2014 | Godager | |
| 2016/0268041 A1 | 9/2016 | Deville et al. | |
| 2017/0074048 A1* | 3/2017 | Patel | E21B 47/06 |

\* cited by examiner

SLIDE-ON INDUCTIVE COUPLER SYSTEM

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. The present application is a continuation of U.S. application Ser. No. 15/034,911, filed May 6, 2016, which is a National Stage of International Application No. PCT/US2014/064522, filed Nov. 7, 2014, which claims priority benefit of U.S. Provisional Application No. 61/902,069, filed Nov. 8, 2013, the entirety of each of which is incorporated by reference herein and should be considered part of this specification.

BACKGROUND

This disclosure relates to well completions and more particularly to methods and apparatuses for communicating data and/or power signals across a casing.

DESCRIPTION OF THE RELATED ART

A wide variety of well equipment may be installed in a well to facilitate operation and monitoring of the well. For example, the well equipment may comprise completion systems installed in a wellbore to enable production of hydrocarbon fluids, such as oil and gas, or to facilitate injection of fluids into the well. The well equipment often includes electrical devices which are powered. In some applications, the electrical devices also provide data which is transmitted to a control system located at a surface of the earth or at another suitable location. In some applications, the power and/or data signals may be transmitted through inductive couplers.

SUMMARY

In general, a system and methodology are provided for utilizing an inductive coupler assembly with casing, e.g. well casing. An inductive coupler is formed as a female inductive coupler with an inductive coil. The inductive coupler is constructed for sliding movement along an exterior of the casing so that it may ultimately be positioned and secured at a suitable location along the casing. The inductive coupler may be connected with an electrical device, e.g. a sensor. The inductive coupler facilitates the transfer of sensor data and/or power signals across the casing. Signal transfer across the casing is further enabled by a male inductive coupler positioned within the casing at a location which allows it to cooperate with the exterior, female inductive coupler. For example, power signals may be sent to the electrical device (or devices) across the casing, and communication signals may be sent bidirectionally across the casing to and from the electrical device (or devices).

However, many modifications are possible without materially departing from the teachings of this disclosure. Accordingly, such modifications are intended to be included within the scope of this disclosure as defined in the claims.

BRIEF DESCRIPTION OF THE DRAWINGS

So that the manner in which the above recited features can be understood in detail, a more particular description may be had by reference to embodiments, some of which are illustrated in the appended drawings, wherein like reference numerals denote like elements. It should be understood, however, that the appended drawings illustrate various embodiments and are therefore not to be considered limiting of its scope, and may admit to other equally effective embodiments.

DETAILED DESCRIPTION

Figure 1:
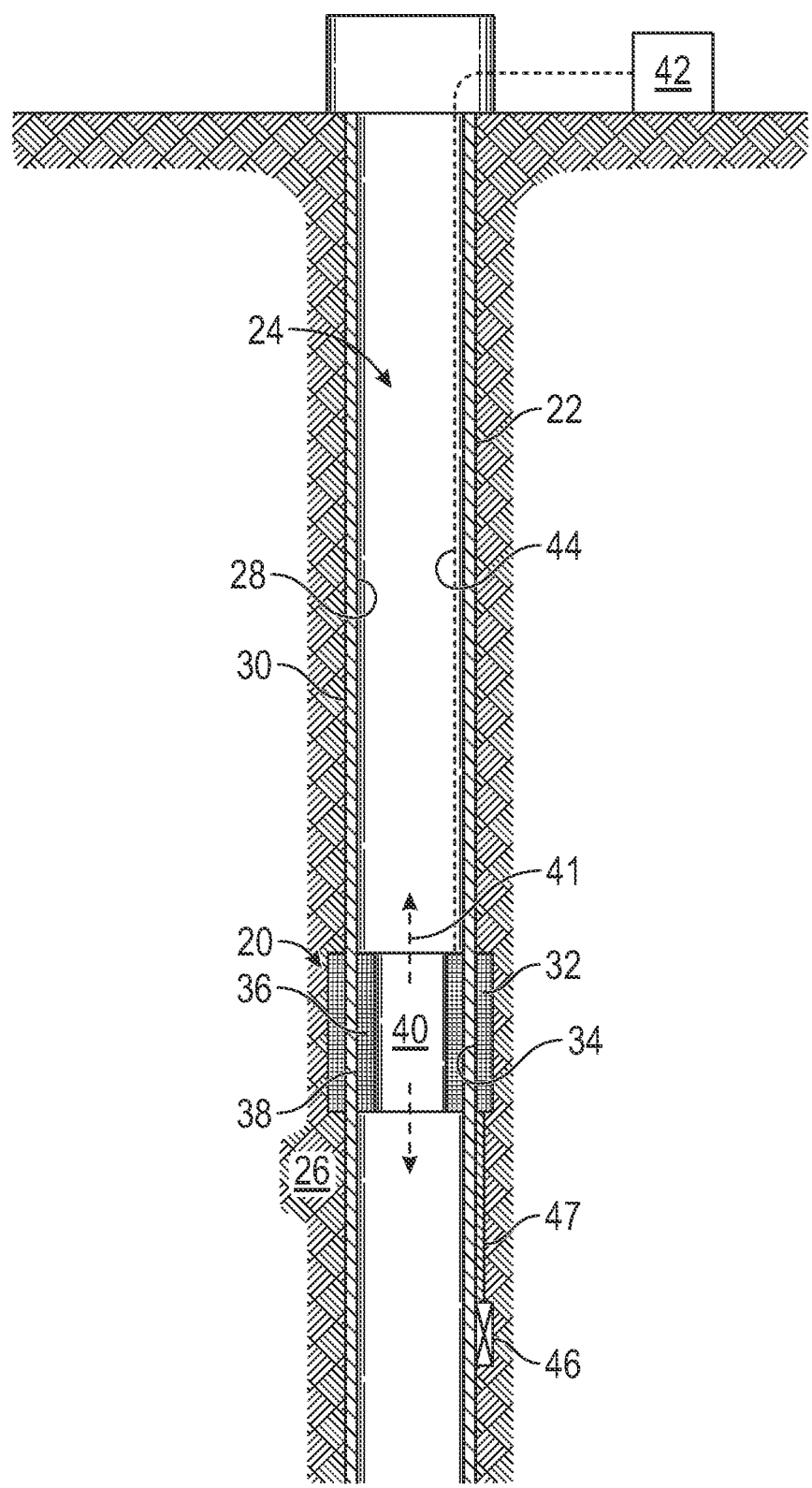
FIG. 1 is a schematic illustration of an example of an inductive coupler located along a well casing deployed in a wellbore, the inductive coupler being connected to an electrical device, according to an embodiment of the disclosure.

In the following description, numerous details are set forth to provide an understanding of the present disclosure. It will be understood by those skilled in the art, however, that the embodiments of the present disclosure may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the disclosure.

The disclosure herein generally involves a system and methodology for utilizing an inductive coupler system with casing. For example, the inductive coupler system may be used with well casing deployed along a wellbore extending into a subterranean formation. The inductive coupler system comprises an inner or male inductive coupler and an outer or female inductive coupler each having an inductive coil. The outer inductive coupler is constructed for sliding movement along an exterior of the casing. In many applications, the outer inductive coupler may be slid over the casing and secured without modifications to the casing, thus ensuring casing integrity.

The outer or female inductive coupler ultimately is positioned at a suitable location along the casing and secured at that location. The female inductive coupler also is designed to be operatively connected with an electrical device, e.g. a sensor. Data may be sent from or to the electrical device across the casing via the inductive coupler. Depending on the application, power signals also may be transferred across the casing via the inductive coupler. In some applications, the male inductive coupler is mounted within the casing or positioned within the casing via well equipment (e.g. positioned as part of a well completion or well tool). The male inductive coupler is positioned at a location which allows it to cooperate with the outer, female inductive coupler for transmitting signals across the casing.

Embodiments described herein use induction principles to enable power and/or information data to be conveyed between the male and female inductive couplers. The male inductive coupler and the female inductive coupler each may comprise at least one coil, a magnetic core, and a metal sleeve enclosing the at least one coil and magnetic core. The coil and magnetic core of the male inductive coupler are radially aligned with the coil and magnetic core of the female inductive coupler to facilitate inductive transfer of power and/or data signals.

A magnetic field is created by running electrical current through the coil or coils of one of the inductive couplers. The electrical current induces a current flow in the opposed coil or coils of the other inductive coupler. This allows power and/or data signals to be transferred across the casing, i.e. across the casing wall. The construction of the outer or female inductive coupler enables the female inductive coupler to be readily slid onto the casing and moved to a desired position without detrimentally affecting the integrity of the casing.

Referring generally to FIG. 1, an example of an inductive coupler system 20 is illustrated as disposed along a casing 22. By way of example, the casing 22 may be disposed along a wellbore 24 drilled into a subterranean formation 26. In some well applications, the well casing 22 is formed of non-magnetic, low conductivity metal. The casing 22 has an interior surface 28 and an exterior surface 30. An outer or female inductive coupler 32 of inductive coupler system 20 is illustrated as positioned at a desired exterior location along the exterior surface 30 of casing 22. The female inductive coupler 32 may be constructed with a circular interior 34 sized to encircle the casing 22. This construction allows the female inductive coupler 32 to be slid along the exterior surface 30 until positioned at the desired exterior location. The female inductive coupler 32 can then be secured at the desired exterior location by suitable fasteners and/or devices as described in greater detail below.

The inductive coupler system 20 also comprises a male inductive coupler 36 positioned at a desired interior location within the casing 22 and along the interior surface 28. The male inductive coupler 36 may be constructed with a circular exterior 38 sized to fit within casing 22 generally adjacent interior surface 28. The male inductive coupler 36 also may have an internal passage 40 sized to enable movement therethrough of equipment and/or fluids as represented by arrow 41. The male inductive coupler 36 may be mounted and secured at the desired location within casing 22 via appropriate fasteners or mounting devices. However, the male inductive coupler 36 also may be positioned at the desired location within casing 22 via well equipment carrying the male inductive coupler 36 through the interior of the casing 22. For example, the male inductive coupler 36 may be mounted on a well tool, well completion, or other well tubing string which carries the coupler 36 to the desired interior location.

As further illustrated in FIG. 1, the inductive coupler system 20 may be connected to a control system 42, such as a surface control system. The control system 42 may be used to send and/or receive power and data signals via a suitable communication line 44, such as a wired or wireless communication line. By way of example, the control system 42 may be designed to send power and data signals downhole while receiving data signals from an electrical device 46 (or devices 46) located downhole. In the example illustrated, the electrical device 46 is connected with female inductive coupler 32 and positioned externally of casing 22. The electrical device 46 may be connected directly with female inductive coupler 32 or connected via a suitable cable 47, e.g. a permanent downhole cable. The electrical device 46 also may comprise a variety of sensors or other devices used to accumulate data on formation parameters or other well related parameters. In some applications, the electrical device 46 may comprise one or more pressure sensors to monitor pressure outside of casing 22.

As described in greater detail below, the female inductive coupler 32 and the male inductive coupler 36 may each comprise a coil (or coils) enclosed by a metallic sleeve or tube. Each inductive coupler 32 and 36 may be constructed so as to have a higher efficiency by utilizing a substantial number of turns on each coil. Additionally, the metallic sleeve behaves as a secondary coil in short-circuit and thus the voltage for one turn of the coil can be minimized to minimize losses in the metallic sleeve.

Figure 2:
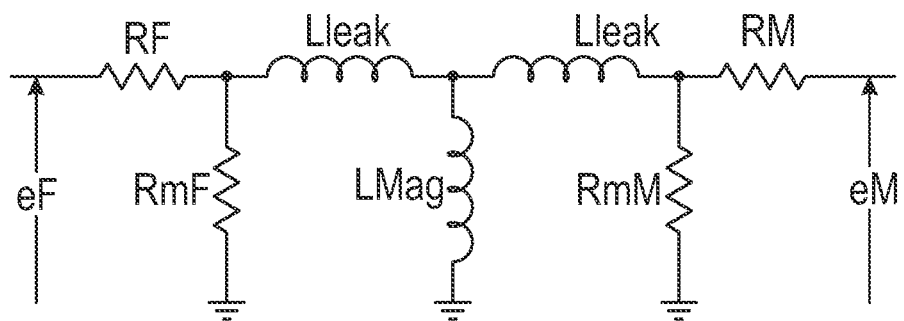
FIG. 2 is a schematic illustration of an inductive coupler electrical model, according to an embodiment of the disclosure.

In FIG. 2, a circuit diagram is provided to show an equivalent circuit for a one-turn inductive coupler (each coil has one turn) with RmF and RmM being the metallic sleeve resistance. For n turns of primary coil, the equivalent circuit is similar but with resistances in parallel and will become $RmF*n^2$ and $RmM*n^2$. To minimize the current in those branches, a high n may be employed to create higher resistance and lower current in the branch. The principal also can be extended to transferring power and telemetry signals via inductive coupling to the casing. Various parameters can be optimized. For example, a high electrical resistivity, non-magnetic (e.g. relative magnetic permeability=1) material may be used for the casing; power may be transferred at low frequency (e.g. 50 Hz or less) and low voltage (e.g. 5-10V); and telemetry signals may be transferred via a low frequency carrier (e.g. around 1 kHz or less) and at low voltage (e.g. below 5V).

Figure 3:
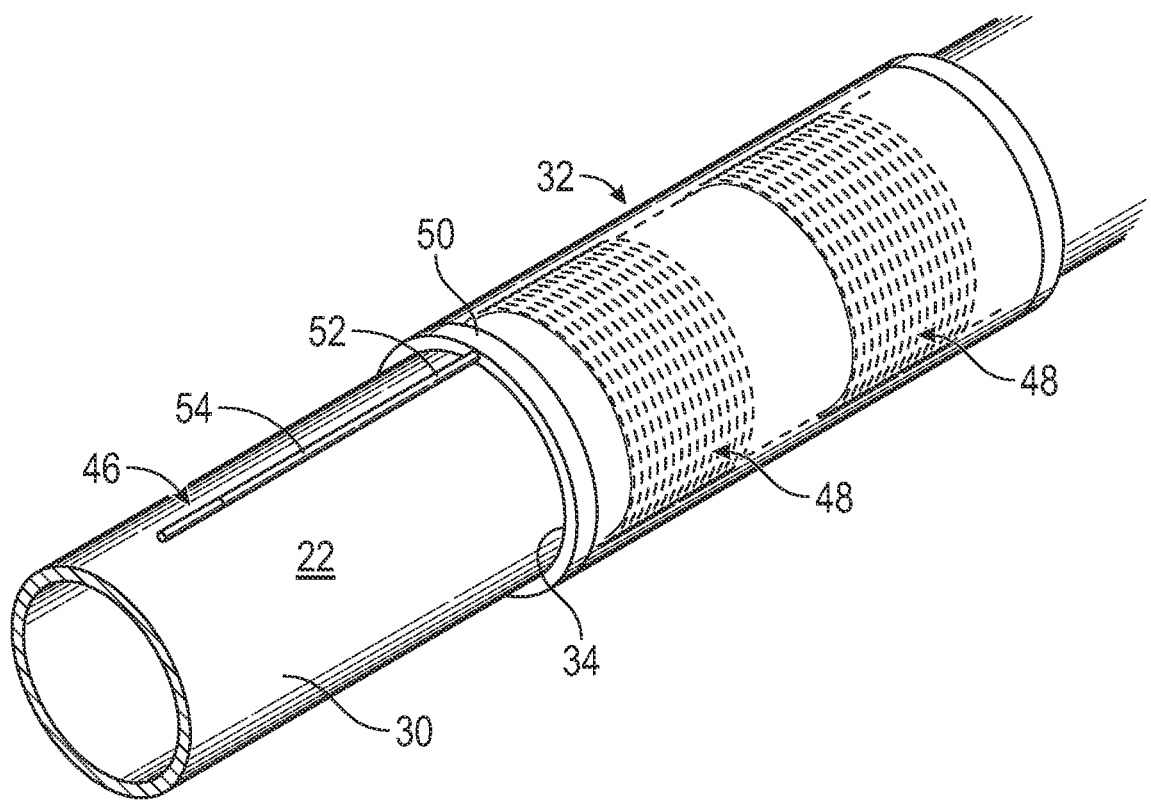
FIG. 3 is an orthogonal view of an example of an inductive coupler positioned on casing with an associated electrical device, according to an embodiment of the disclosure.

Referring generally to FIG. 3, an example of inductive coupler system 20 is illustrated as comprising female inductive coupler 32 slid over well casing 22. However, other embodiments of female inductive coupler 32 may be constructed for sliding engagement with the well casing 22 or with other types of casing 22. In this particular example, the female inductive coupler 32 comprises a plurality of female inductive coupler coils 48, e.g. two coils, mounted in a female inductive coupler body 50. The body 50 has circular interior 34 sized to enable the female inductive coupler 32 to be slid onto casing 22 along an exterior surface 30 to a desired location. In this example, one of the coils 48 may be used for power signals and the other of the coils 48 may be used for data, e.g. telemetry, signals.

In the example illustrated, electrical device 46 comprises a sensor cartridge 52 directly integrated into the slide-on, female inductive coupler 32. The sensor cartridge 52 comprises a sensor 54, such as a pressure gauge. In some embodiments, the electrical device 46, e.g. sensor 54, may be connected to female inductive coupler 32 via cable 47 or via another suitable signal carrier. The use of cable 47 enables placement of the electrical device 46, e.g. sensor 54, at a location along the exterior of casing 22 and farther away from the body 50 of female inductive coupler 32. It should be noted that electrical device 46 may comprise a variety of other devices, including actuators or other downhole tools which may be connected with the female inductive coupler 32 directly or via cable 47.

Figure 4:
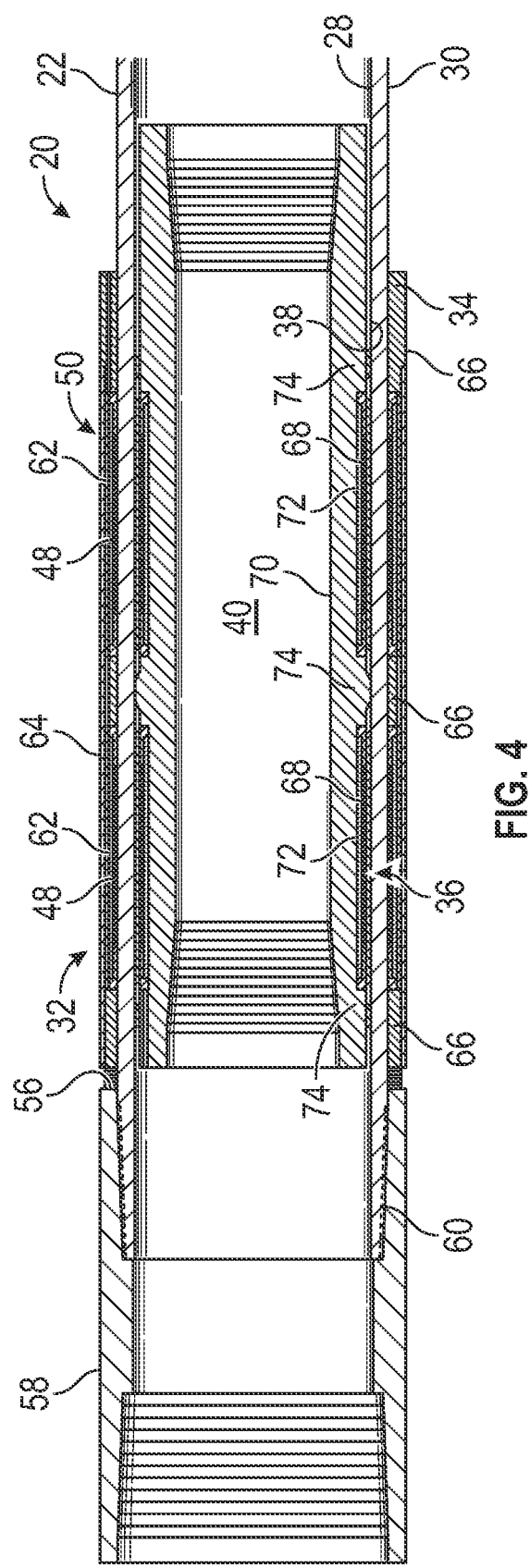
FIG. 4 is a cross-sectional view of an example of an inductive coupler assembly, according to an embodiment of the disclosure.

Referring generally to FIG. 4, a cross-sectional view of an example of inductive coupler system 20 is illustrated. In this example, female inductive coupler 32 is again slid along the exterior of casing 22 until further motion is blocked by an abutment 56, such as an abutment formed by a casing coupling 58 connected to casing 22. Casing coupling 58 may be connected to casing 22 via a threaded engagement region 60 or via other suitable connectors.

In the illustrated embodiment, female inductive coupler 32 again comprises a plurality, e.g. two, coils 48 for transfer of power and data/telemetry signals, respectively. A magnetic core 62 is positioned circumferentially around each coil 48 and a metallic sleeve or tube 64 is positioned circumferentially around the magnetic cores 62 and coils 48. In some embodiments, a single metallic tube 64 may enclose the magnetic cores 62 and coils 48 collectively. In the specific example illustrated, the sets of corresponding coils 48 and magnetic cores 62 are positioned axially between spacers 66, e.g. spacer rings, and radially between metallic tube 64 on their exterior and casing 22 on their interior.

In the example illustrated in FIG. 4, the male inductive coupler 36 is moved along the interior of casing 22 and positioned along interior surface 28 at a desired location. The illustrated male inductive coupler 36 comprises a plurality of male inductive coupler coils 68, e.g. two male inductive coupler coils 68. The male inductive coupler 36 is moved along the interior of casing 22 until the male inductive coupler coils 68 are generally radially aligned with the female inductive coupler coils 48, as illustrated. The radial alignment of coil 68 with coils 48 facilitates transfer of power and data/telemetry signals across casing 22, i.e. across the tubular wall forming casing 22.

As with the female inductive coupler 32, the male inductive coupler 36 may comprise a male inductive coupler body 70 into which coils 68 are mounted. A male magnetic core 72 may be positioned circumferentially within each coil 68 and the male inductive coupler body 70 may be constructed as a metallic sleeve or tube positioned circumferentially within the magnetic cores 72 and coils 68. In some embodiments, the coupler body 70 also may comprise spacer rings 74 which may be formed integrally with coupler body 70 or as separate rings. The sets of corresponding coils 68 and male magnetic cores 72 are positioned axially between the spacer rings 74. Additionally, the sets of corresponding coils 68 and male magnetic cores 72 are located radially between the metallic coupler body 70 on their interior and the casing 22 on their exterior.

Figure 5:
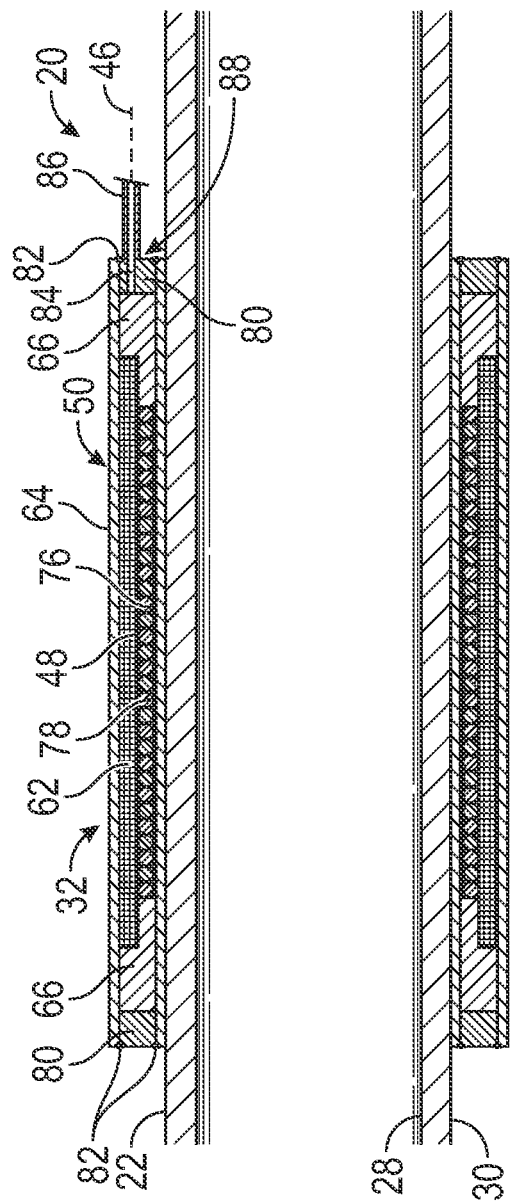
FIG. 5 is a cross-sectional view of another example of an inductive coupler positioned along a casing, according to an embodiment of the disclosure.

Referring generally to FIG. 5, another embodiment of inductive coupler system 20 is illustrated. In this example, the female inductive coupler 32 is illustrated to facilitate explanation, but the male inductive coupler 36 may have a similar corresponding construction along the interior of casing 22. Additionally, the embodiment of FIG. 5 illustrates a single coil 48, but other applications may utilize similar constructions with a plurality of coils 48 separated by, for example, additional spacers 66.

In this example, the coil 48 and magnetic core 62 are positioned axially between a pair of the spacers 66. However, the coil 48 and the magnetic core 62 are positioned radially between an inner metallic sleeve or tube 76 and outer metallic sleeve or tube 64. The female inductive coupler 32 (as well as the male inductive coupler 36) may be constructed so that the coils 48, magnetic core 62, and corresponding magnetic circuits are fully encased in metallic material.

By way of example, the female inductive coupler 32 may be constructed by inserting spacers 66 on inner metallic tube 76. In some applications, the spacers 66 are formed of high resistivity, non-magnetic metal. Depending on the application and environment, an insulation layer 78 may be disposed between inner metallic tube 76 and coil 48 in the region axially between spacers 66. The coil 48 may be wound or otherwise constructed in the axial region between spacers 66. The magnetic core 62 is then placed around the coil 48, i.e. placed radially above or outward of coil 48. Axially outer rings 80 are then placed adjacent the axially outer ends of spacers 66 and outer metallic tube 64 is inserted and slid over axially outer rings 80, spacer 66, and magnetic core 62. The inner metallic tube 76, outer metallic tube 64, and axially outer rings 80 may then be secured together by suitable fasteners to fully enclose the coil 48 and magnetic core 62 within metallic material. By way of example, a plurality of welds 82 may be made between axially outer rings 80 and inner and outer metallic tubes 76, 64. However other fastening techniques, e.g. brazing or threaded fasteners, may be used to secure the components and to enclose coil 48 and magnetic core 62.

The electrical device 46, e.g. sensor, may be operatively coupled with coil 48 and magnetic core 62 via a suitable magnetic circuit 84. Engagement between the electrical device 46 (or cable 47) and the suitable magnetic circuit 84 may be facilitated via a connector 86 engaging a port 88. The port 88 may extend through one of the axially outer rings 80 or through another suitable component of the inductive coupler. In some applications, the connector 86 may be sealed via welding (or otherwise sealed) with one of the end rings 80.

Figure 6:
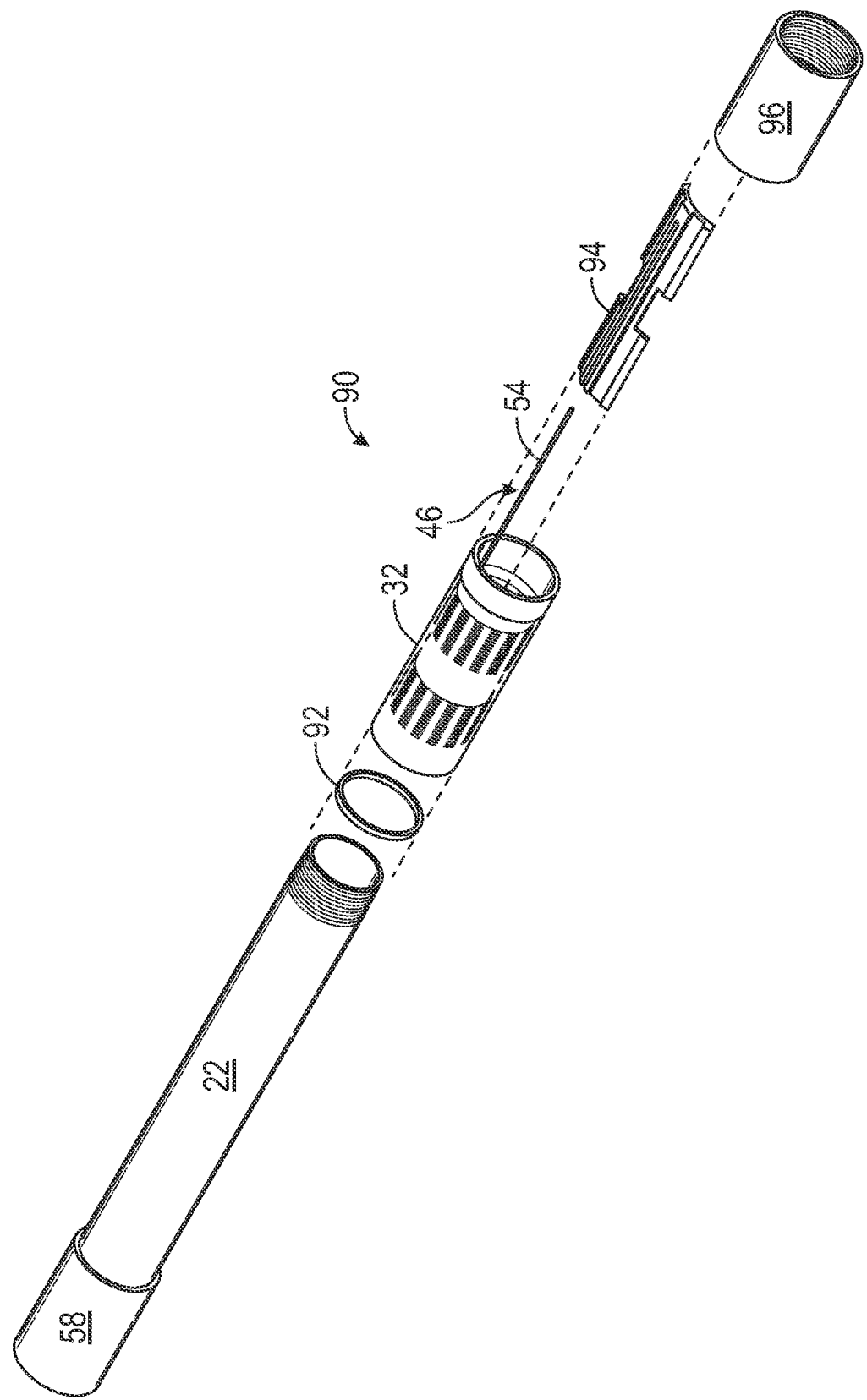
FIG. 6 is an exploded view of an example of a female inductive coupler assembly and casing section, according to an embodiment of the disclosure.

A variety of component constructions and arrangements may be used to assemble the female inductive coupler 32 and/or the male inductive coupler 36. As illustrated in FIG. 6, for example, the female inductive coupler 32 may be slid onto and secured along casing 22 via a variety of cooperating components. In this specific example, an overall assembly 90 comprises casing coupling 58, casing 22, and female inductive coupler 32 which may include or be coupled with electrical device 46 comprising sensor 54. Additionally, the illustrated embodiment of assembly 90 comprises a spring member 92, a protective device 94 to protect sensor 54, and a second casing coupling 96. The illustrated components, as well as additional and/or other components, may be connected together via various fastening devices, such as clamps, threaded fasteners, interference fits, weldments, adhesives, and/or other fastening devices and techniques.

Figure 7:
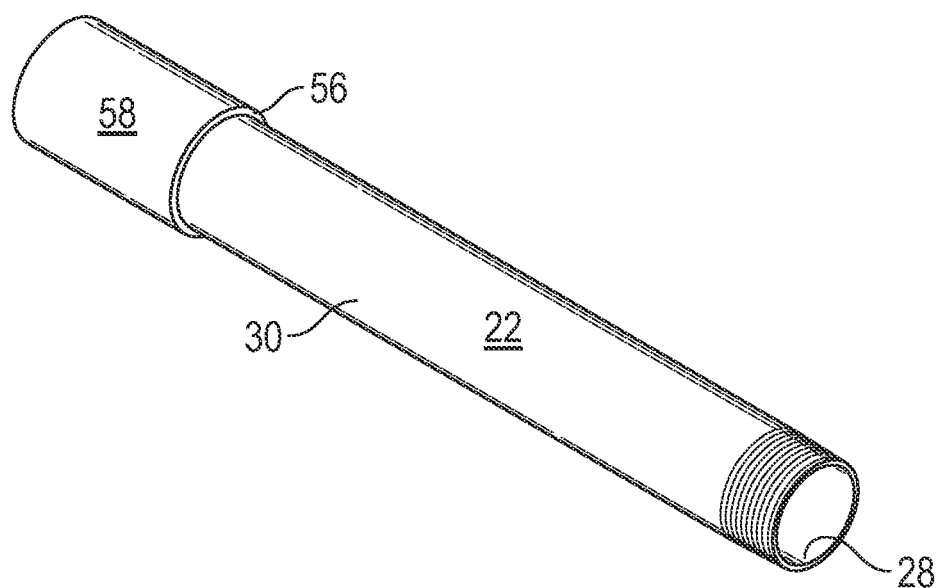
FIG. 7 is an orthogonal view of an example of a section of casing connected to a casing coupling, according to an embodiment of the disclosure.
Figure 8:
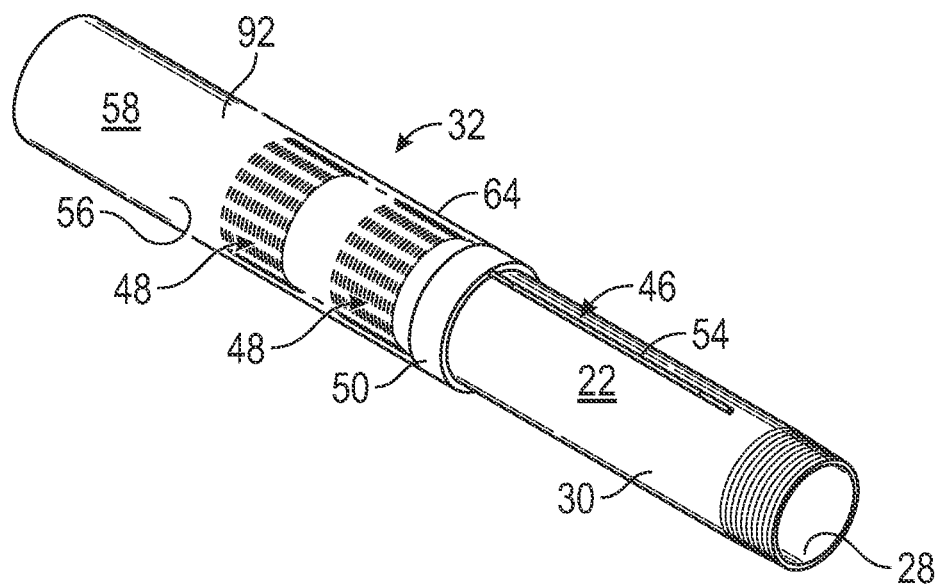
FIG. 8 is an orthogonal view of an example of a female inductive coupler slid onto the section of casing illustrated in FIG. 7, according to an embodiment of the disclosure.
Figure 9:
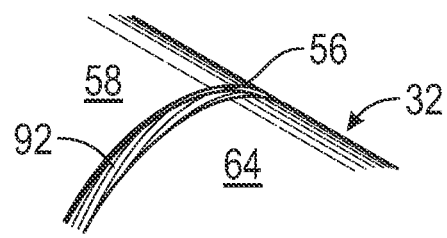
FIG. 9 is an enlarged orthogonal view of a spring member which may be disposed between the female inductive coupler and the casing coupling, according to an embodiment of the disclosure.

In a specific example, the casing 22 comprises in part a casing spacer to which casing coupling 58 is threadably engaged, as illustrated in FIG. 7. Subsequently, the spring member 92 is slid onto casing 22 and female inductive coupler 32 is slid onto casing 22 following spring member 92. The female inductive coupler 32 is slid along the exterior surface 30 of casing 22 until further travel is blocked via abutment 56 created by casing coupling 58. As illustrated in FIGS. 8 and 9, the female inductive coupler 32 is positioned via casing coupling 58 and spring member 92, the spring member 92 being trapped between casing coupling 58 and female inductive coupler 32.

Figure 10:
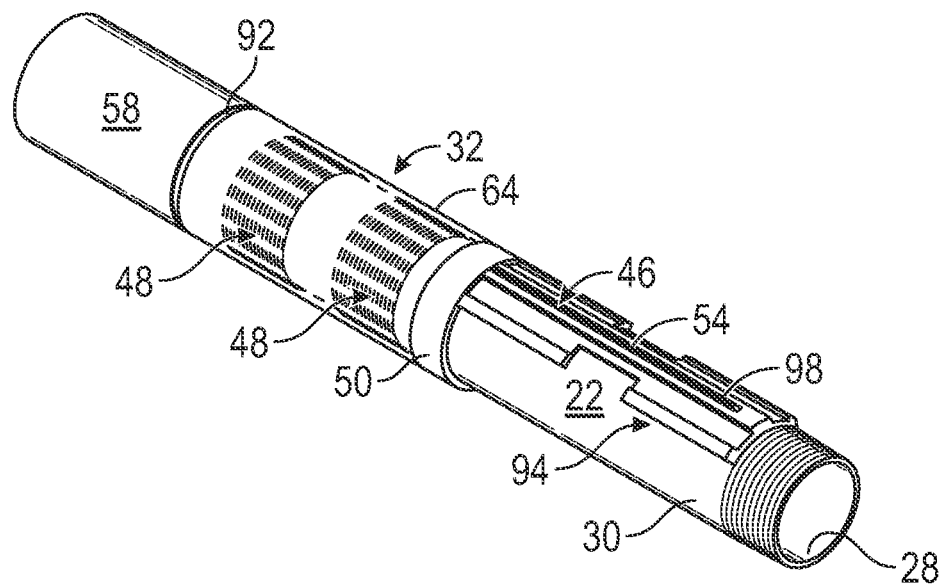
FIG. 10 is an orthogonal view of an example of a female inductive coupler and an electrical device with a device protector slid onto the section of casing illustrated in FIG. 7, according to an embodiment of the disclosure.

Subsequently, protective device 94 is slid onto casing 22 and into engagement with an axial end of female inductive coupler 32 opposite casing coupling 58, as illustrated in FIG. 10. Depending on the configuration of device 46, the protective device 94 may have a variety of sizes, shapes and configurations. In the example illustrated, the protective device 94 is generally circular and sized to receive casing 22 therethrough. In some applications, the protective device 94 may be clamped to casing 22. The protective device 94 further comprises a sensor/device receiving cavity 98 sized to receive and protect electrical device 46. In the example illustrated, electrical device 46 comprises sensor 54, such as a pressure gauge, which slides into receiving cavity 98 for protection during deployment downhole and during operation downhole in wellbore 24.

Figure 11:
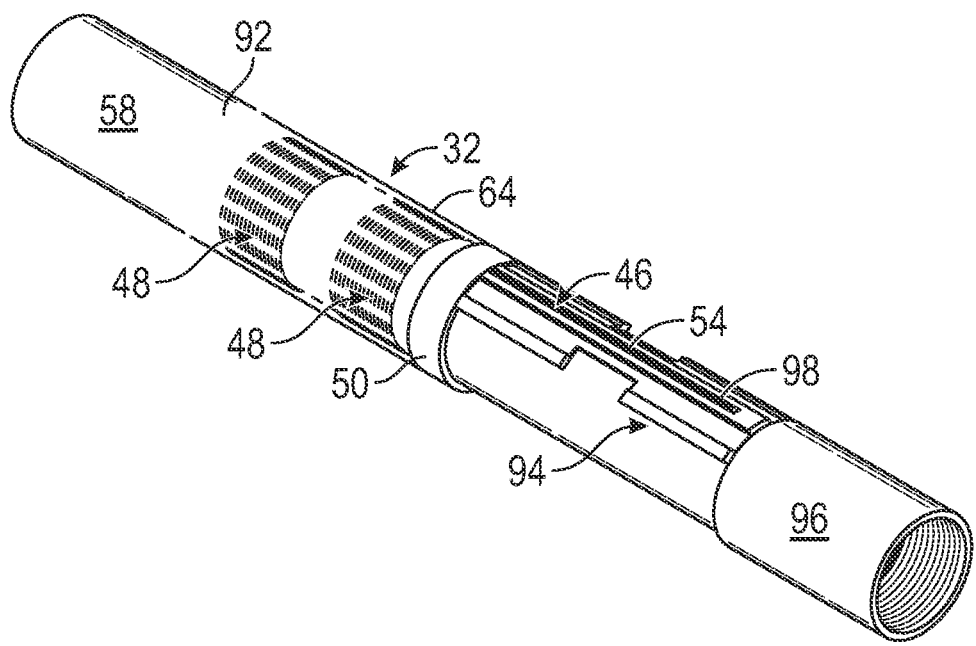
FIG. 11 is an orthogonal view similar to that of FIG. 10 but showing a second casing coupling securing the female inductive coupler and the sensor/device protector on the section of casing, according to an embodiment of the disclosure.

The female inductive coupler 32 and protective device 94 may be secured in place along casing 22 via second casing coupling 96, as illustrated in FIG. 11. By way of example, casing coupling 96 may be threadably engaged with casing 22 and appropriately torqued to hold the female inductive coupler 32, device 46, and protective device 94 in compression, thus avoiding unwanted movement of these devices during operation of device/sensor 46. In this example, the overall casing 22 comprises the illustrated casing spacer which is connected into the rest of the casing 22 via casing couplings 58 and 96. However, various other fasteners and devices may be used along casing 22 to secure the slide-on, female inductive coupler 32 at a desired location along the casing 22 without otherwise modifying the casing or detrimentally affecting the integrity of the casing.

Depending on the parameters of a given application, the structure and components of the inductive coupling system 20, casing 22, device or devices 46, and control system 42 may vary. For example, casing 22 may be constructed in a variety of sizes and forms along the wellbore 24 for cooperation with many types of well completions and other downhole equipment. In some applications, the casing may comprise a non-well related casing. Similarly, the electrical device or devices 46 may comprise many types of sensors, e.g. pressure sensors, temperature sensors, resistivity sensors, flow sensors, and/or many other sensors deployed to monitor well related parameters external to the casing. The control system 42 also may comprise various types of power supplies and/or processing systems for processing data transmitted uphole with the aid of inductive coupler system 20.

The inductive coupler system 20 also may comprise many configurations of female inductive couplers and male inductive couplers. In some applications, each of the female and male inductive couplers comprises a single coil. However, other applications may utilize two or more coils in each of the female and male inductive couplers. Various materials, e.g. various metals, also may be used to form the components of inductive coupler system 20. Similarly, the number of turns of each coil and the electromagnetic circuitry associated with those coils may vary according to the configuration of the inductive coupler system and the environment in which the system is operated.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. A system for use in a well, comprising:
a well casing having an interior surface and an exterior surface;
a male inductive coupler positioned at a desired interior location within the well casing along the interior surface, the male inductive coupler comprising a male inductive coupler coil; and
a female inductive coupler separate from the well casing, sized to slide along the exterior surface, and positioned at a desired exterior location external to the well casing along the exterior surface, the female inductive coupler comprising a female inductive coupler coil;
the female inductive coupler coil being generally radially aligned with the male inductive coupler coil to enable inductive transfer of signals across the well casing;
wherein an axial end of the female inductive coupler is positioned proximate and axially aligned with an axial end of a casing coupling connected to the well casing and wherein the system further comprises a spring positioned axially between the axial end of the casing coupling and the axial end of the female inductive coupler.

2. The system as recited in claim 1, wherein the male inductive coupler and the female inductive coupler cooperate to transmit telemetry data signals across the well casing.

3. The system as recited in claim 1, wherein the male inductive coupler and the female inductive coupler cooperate to transmit power signals across the well casing.

4. The system as recited in claim 1, wherein the male inductive coupler comprises a second male inductive coupler coil and the female inductive coupler comprises a second female inductive coupler coil generally radially aligned with the second male inductive coupler coil.

5. The system as recited in claim 4, wherein the male inductive coupler and the female inductive coupler cooperate to transmit telemetry data signals and power signals across the well casing.

6. The system as recited in claim 1, further comprising a sensor coupled to the female inductive coupler.

7. The system as recited in claim 6, further comprising a protection device slid onto the casing, disposed adjacent an axial end of the female inductive coupler, and positioned to protect the sensor.

8. A system for use in a well, comprising:
a well casing having an interior surface and an exterior surface;
a male inductive coupler positioned at a desired interior location within the well casing along the interior surface, the male inductive coupler comprising a male inductive coupler coil; and
a female inductive coupler separate from the well casing, sized to slide along the exterior surface, and positioned at a desired exterior location external to the well casing along the exterior surface, the female inductive coupler comprising a female inductive coupler coil;

the female inductive coupler coil being generally radially aligned with the male inductive coupler coil to enable inductive transfer of signals across the well casing;

wherein the female inductive coupler further comprises:

an inner metal tube; and an outer metal tube, the inner metal tube and the outer metal tube being positioned radially inward and radially outward, respectively, of the female inductive coupler coil.

9. A method of inductively transferring signals in a well environment, comprising:

locating a first inductive coil of a first inductive coupler along an interior of a well casing;

sliding a second inductive coil of a second inductive coupler along an exterior of the well casing until generally radially aligned with the first inductive coil;

coupling a sensor to the second inductive coupler; and further comprising forming the second inductive coupler by:

placing the second inductive coil between spacers positioned at axial ends of the second inductive coil;

positioning a magnetic core around the second inductive coil; and locating the second inductive coil and the magnetic core radially between an inner metallic tube and an outer metallic tube.

10. The method as recited in claim 9, further comprising using the sensor to obtain data on parameters external to the casing; and inductively transferring the data from the second inductive coil, across the well casing, and to the first inductive coil.

11. The method as recited in claim 10, further comprising transferring power across the well casing between the first and second inductive coils to power the sensor positioned external to the well casing.

12. The method as recited in claim 9, wherein coupling comprises coupling the sensor to the second inductive coupler with a cable.

13. The method as recited in claim 9, wherein sliding comprises positioning the second inductive coupler by sliding the second inductive coupler until further motion is blocked by an abutment formed by an axial end of a casing coupling connected to the well casing.

14. The method as recited in claim 9, further comprising forming each of the first inductive coil and the second inductive coil as a plurality of axially separated inductive coils.

15. A method comprising:

forming a female inductive coupler with a coil and a magnetic core positioned axially between a pair spacers and radially between a pair of metallic tubes;

sliding the female inductive coupler along an exterior of a casing until further sliding motion is blocked by an abutment; and securing the female inductive coupler on the casing via a casing coupling by torqueing the casing coupling sufficiently to hold the female inductive coupler in compression axially between the casing coupling and the abutment.

16. The method as recited in claim 15, further comprising moving a male inductive coupler along an interior of the casing to a location radially inward of the position at which the female inductive coupler is secured on the casing.

17. The method as recited in claim 15, wherein a spring is positioned between the abutment and the female inductive coupler.

* * * * *